(12) United States Patent
Nakashin

(10) Patent No.: US 12,265,755 B2
(45) Date of Patent: Apr. 1, 2025

(54) DISPLAY OF TEXT IMAGES OF OVERLAPPING VOICES IN A TELECONFERENCE

(71) Applicant: SEIKO EPSON CORPORATION, Tokyo (JP)

(72) Inventor: Yoshitaka Nakashin, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/951,548

(22) Filed: Sep. 23, 2022

(65) Prior Publication Data

US 2023/0100151 A1    Mar. 30, 2023

(30) Foreign Application Priority Data

Sep. 24, 2021    (JP) ................. 2021-155267

(51) Int. Cl.
*G06F 3/16*    (2006.01)
*G06F 3/147*    (2006.01)

(52) U.S. Cl.
CPC ............. *G06F 3/167* (2013.01); *G06F 3/147* (2013.01)

(58) Field of Classification Search
CPC ................................. G06F 3/147; G06F 3/167
USPC ........................................................ 715/728
See application file for complete search history.

(56) References Cited

U.S. PATENT DOCUMENTS

| 2005/0038661 | A1  | 2/2005 | Momosaki et al. |
| 2014/0096049 | A1* | 4/2014 | Vonshak ............... G06F 3/0486 715/769 |
| 2015/0120825 | A1* | 4/2015 | Waxman ................. H04L 67/75 709/204 |
| 2018/0174600 | A1* | 6/2018 | Chaudhuri ....... H04N 21/44008 |
| 2019/0129596 | A1* | 5/2019 | Ligameri ............. G06F 1/1647 |
| 2021/0174787 | A1* | 6/2021 | Nguyen ................ G06F 3/0486 |
| 2022/0101857 | A1* | 3/2022 | Saunders ................ G10L 15/26 |

FOREIGN PATENT DOCUMENTS

| JP | 2002-344915 A | 11/2002 |
| JP | 2005-064599 A | 3/2005 |
| JP | 2007-096555 A | 4/2007 |
| JP | 2015-028625 A | 2/2015 |
| JP | 2018-092365 A | 6/2018 |
| JP | 2019-191276 A | 10/2019 |
| JP | 2020-064300 A | 4/2020 |

* cited by examiner

*Primary Examiner* — Stephen S Hong
*Assistant Examiner* — Broderick C Anderson
(74) *Attorney, Agent, or Firm* — Dority & Manning, P.A.

(57) ABSTRACT

A display method includes displaying, side by side, in a first region, a first image corresponding to a first terminal and a second image corresponding to a second terminal, when a first voice detected by the first terminal and a second voice detected by the second terminal overlap, displaying a first text image indicating content of the first voice in the first region in association with the first image and displaying a second text image indicating content of the second voice in the first region in association with the second image, and, when receiving operation for moving the first text image to a second region different from the first region, displaying the first text image in the second region.

9 Claims, 9 Drawing Sheets

DISPLAY OF TEXT IMAGES OF OVERLAPPING VOICES IN A TELECONFERENCE

The present application is based on, and claims priority from JP Application Serial Number 2021-155267, filed Sep. 24, 2021, the disclosure of which is hereby incorporated by reference herein in its entirety.

BACKGROUND

1. Technical Field

The present disclosure relates to a display method, a display device, and a display system.

2. Related Art

There have been known a voice conference system and a video conference system that use computers. For example, JP-A-2007-96555 (Patent Literature 1) discloses a configuration for adjusting a voice level according to a priority level of a speaker in order to solve a problem in that voices are unclear when a plurality of participants simultaneously speak is a voice conference system.

As explained above, if utterances of the plurality of speakers overlap, voices are unclear and it is hard to listen and understand contents of the utterances. In contrast, the configuration disclosed in Patent Literature 1 makes it easy to listen and understand an utterance of a speaker having a high priority level. However, it is more hard to listen and understand utterances of the other speakers. Accordingly, when a plurality of speakers simultaneously utter, it is necessary to request any one of the speakers to utter again. Therefore, efficiency of a conference is deteriorated.

SUMMARY

An aspect of the present disclosure is directed to a display method including: displaying, side by side, in a first region, a first image corresponding to a first terminal and a second image corresponding to a second terminal; when a first voice detected by the first terminal and a second voice detected by the second terminal overlap, displaying a first text image indicating content of the first voice in the first region. In association with the first image and displaying a second text image indicating content of the second voice in the first region in association with the second image; and, when receiving operation for moving the first text image to a second region different from the first region, displaying the first text image in the second region.

Another aspect of the present disclosure is directed to a display device including: a display; and a control circuit configured to control the display. The control circuit executes: controlling the display to thereby display, side by side, in a first region, a first image corresponding to a first terminal and a second image corresponding to a second terminal; when a first voice detected by the first terminal and a second voice detected by the second terminal overlap, controlling the display to thereby, display a first text image indicating content of the first voice in the first region in association with the first image and display a second text image indicating content of the second voice in the first region in association with the second image; and, when receiving operation for moving the first text image to a second region different from the first region, controlling the display to thereby display ale first text image in the second region.

Another aspect of the present disclosure is directed to a display system including: a first terminal including a first microphone; a second terminal including a second microphone; and a third terminal including a display. The third terminal: displays, side by side, in a first region of the display, a first image corresponding to the first terminal and a second image corresponding to the second terminal; displays a first text image indicating content of a first voice detected by the first terminal with the first microphone in the first region in association with the first image and displays a second text image indicating content of a second voice detected by the second terminal with the second microphone in association with the second image; and, when receiving operation for moving the first text image from the first region to a second region of the display, displays the first text image in the second region.

DESCRIPTION OF EXEMPLARY EMBODIMENTS

1. Overview of a Conference System

An embodiment is explained below with reference to the drawings.

Figure 1:
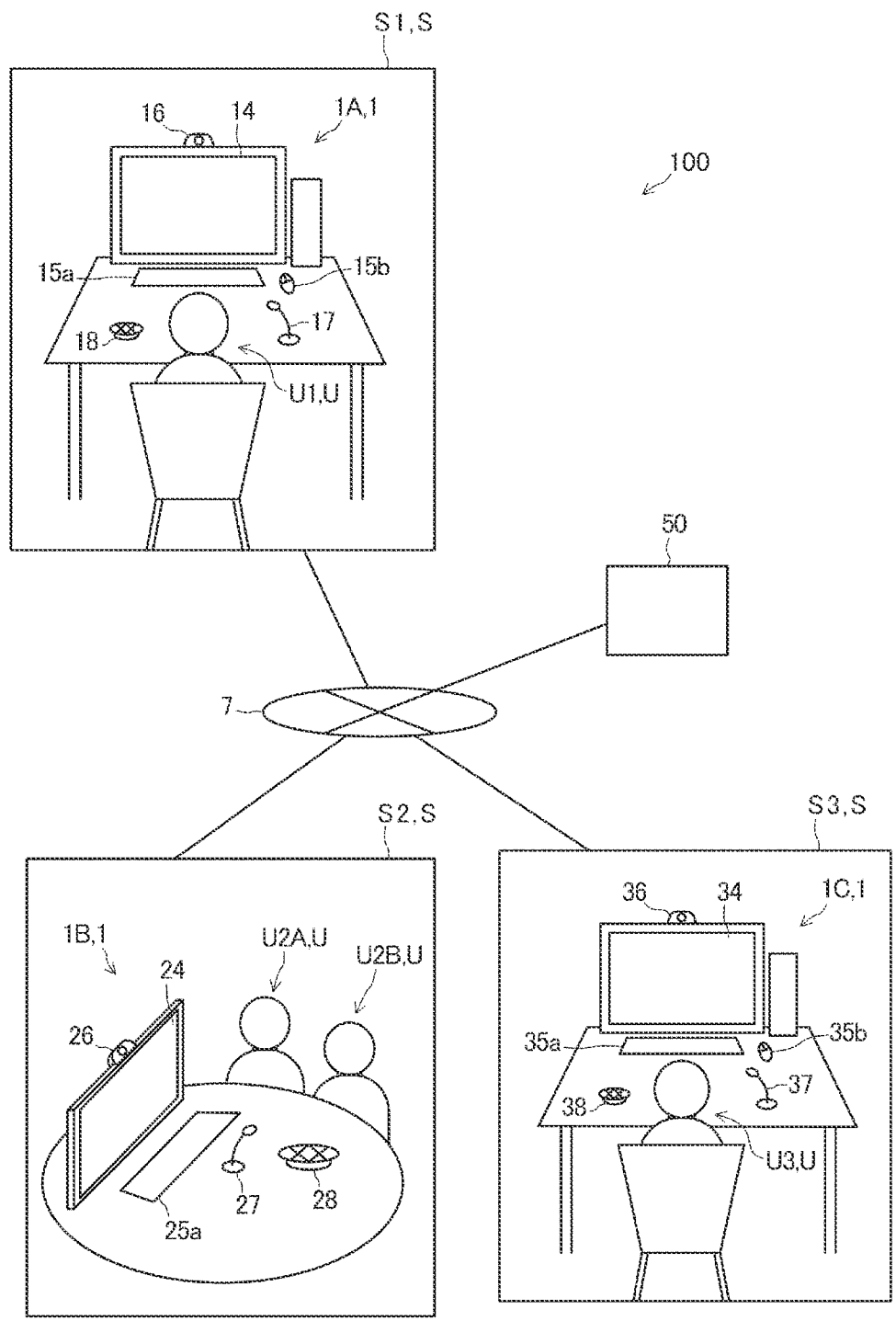
FIG. 1 is a diagram showing an example of the configuration conference system according to an embodiment.

FIG. 1 is a diagram showing an example of the configuration of a conference system 100 according to this embodiment.

The conference system 100 is a system in which a plurality of users U hold a conference while sharing voices using computers. The conference system 100 includes a plurality of terminals 1 respectively used by the plurality of users U and a server 50. The terminals 1 and the server 50 are connected to be capable of performing data communication with each other through a communication network 7. The conference system 100 corresponds to an example of a display system.

The number of terminals 1 included in the conference system. 100 is not limited. The server 50 may be one computer, may be configured by a plurality of computers, or may be a Cloud server.

In this embodiment, as shown in FIG. 1, an example is explained in which the conference is held using three terminals 1. In the following explanation, the three terminals 1 are referred to as first terminal 1A, second terminal 1B, and third terminal 1C. When these terminals are not distinguished, the terminals are described as terminals 1. The first terminal 1A, the second terminal 1B, and the third terminal 1C are computers having a communication function and, specifically, are desktop PCs (Personal Computers), tablet PCs, smartphones, or the like. The third terminal 1C corresponds to an example of a display device. The same applies to the first terminal 1A and the second terminal 1B.

In the example shown in FIG. 1, the first terminal 1A is set in a base S1, the second terminal. 1B is set in a base S2, and the third terminal 1C is set in a base S3. A geographical relation among the bases S1, S2, and S3 is not limited. The bases S1, S2, and S3 may be places separated from one another, may be places in the same building, or may be places partitioned from one another in the same room. In the following explanation, when the bases S1, S2, and S3 are not distinguished, the bases S1, S2, and S3 are described as bases S.

The number of users U who use the terminals 1 is not limited. For example, a plurality of users U may participate in the conference using one terminal 1. When the terminals 1 are portable computers, the users U may carry and use the terminals 1. In this embodiment, one user U1 uses the first terminal 1A, two users U2A and U2B use the second terminal 1S, and one user U3 uses the third terminal 1C. When the users U1, U2A, U2B, and U3 are not distinguished, the users U1, U2A, U2B, and U3 are described as users U.

The communication network 7 may be a LAN (Local Area Network) or may be a WAN (Wide Area Network). The communication network 7 may be a global network including a dedicated line, a public line network, the Internet, and the like.

The first terminal 1A includes a first display 14, a keyboard 15a, a mouse 15b, a camera 16, a microphone 17, and a speaker 18. These devices are connected to a main body of the first terminal 1A by wire or radio. At least one of the devices may be integrally incorporated in the main body of the first terminal 1A. In both the cases, these devices are sometimes referred to as the first display 14 of the first terminal 1A, the microphone 17 of the first terminal 1A, and the like. The first display 14 is a display device including a display, panel such as a liquid crystal display panel, an organic EL (Electro-Luminescence) panel, or a plasma display panel. The keyboard 15a and the mouse 15b are input devices that the user U1 uses for input operation. The camera 16 images the user U1. The microphone 17 collects voice of the user U1. The speaker 16 outputs voices of the conference. The user U1 participates in the conference using these devices. The microphone 17 corresponds to an example of a first microphone.

The second terminal 1B includes a second display 24, a keyboard 25a, a camera 26, a microphone 27, and a speaker 28. These devices are connected to a main body of the second terminal 1B by wire or radio. The second display 24, the keyboard 25a, the camera 26, the microphone 27, and the speaker 28 are respectively configured the same as the first display 14, the keyboard 15a, the camera 16, the microphone 17, and the speaker 18. The microphone 27 corresponds to an example of a second microphone.

The camera 26 images the users U2A and U2B. The microphone 27 collects voices of the users U2A and U2B. The speaker 28 outputs voices of the conference. The users U2A and U2B participate in the conference using these devices.

The third terminal 1C includes a third display 34, a keyboard 35a, a camera 36, a microphone 37, and a speaker 38. These devices are connected to a main body of the third terminal 1C by wire or radio. The third display 34, the keyboard 35a, the camera 36, the microphone 37, and the speaker 38 are respectively configured the same as the first display 14, the keyboard 15a, the camera 16, the microphone 17, and the speaker 18.

The camera 36 images the user U3. The microphone 37 collects voice of the user U3. The speaker 38 outputs voices of the conference. The user U3 participates in the conference using these devices.

Figure 2:
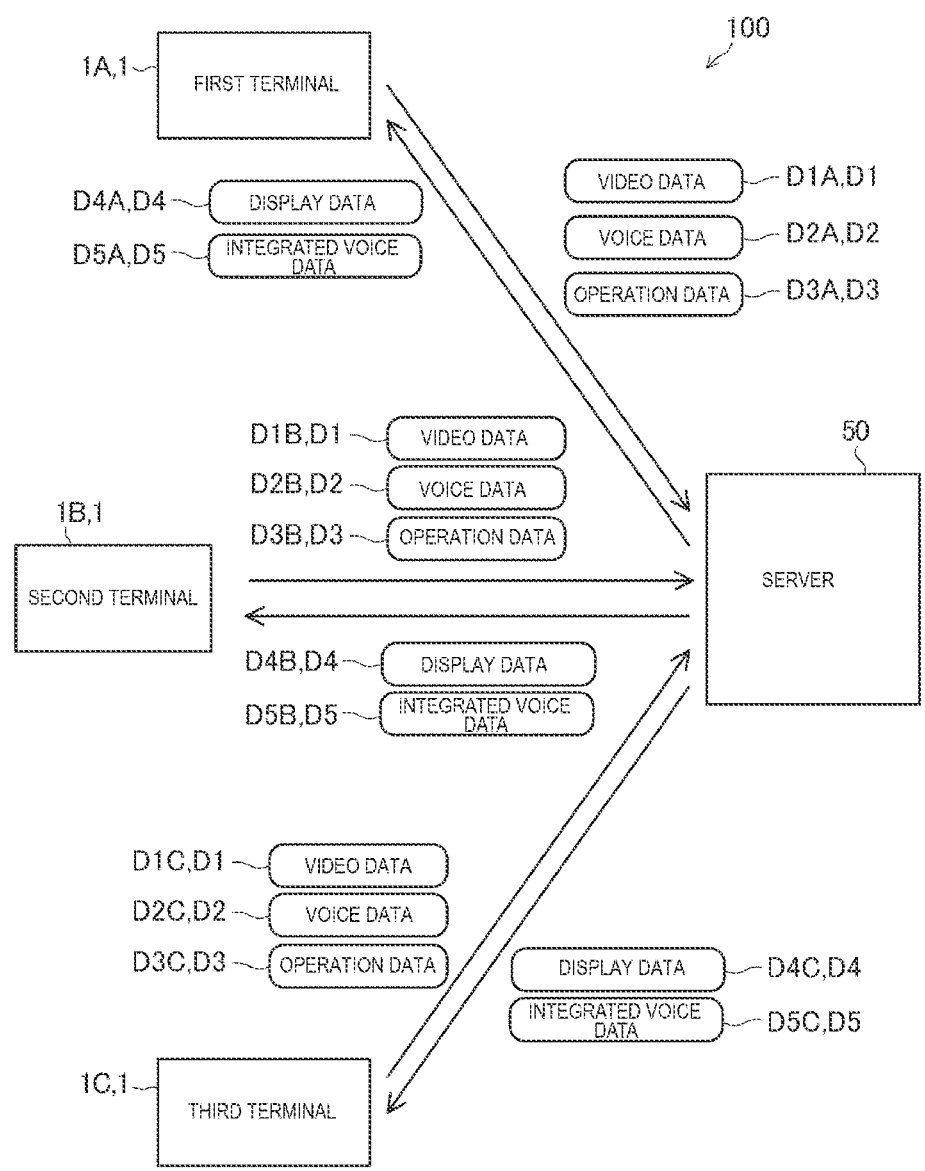
FIG. 2 is an explanatory diagram showing an overview of the operation of the conference system.

FIG. 2 is an explanatory diagram showing an overview of the operation of the conference system 100.

The conference executed using the conference system 100 is performed by the plurality of users U sharing at least voices of the users U with one another. The conference system 100 may be configured to hold the conference while sharing images and videos captured by the cameras 16, 26, and 36. In this embodiment, the conference system. 100 holds the conference while sharing videos captured by the cameras 16, 26, and 36.

In FIG. 2, as data transmitted from the first terminal 1A, the second terminal 1B, and the third terminal 1C to the server 50, video data D1A, D1B, and DIG, voice data D2A, D2B, and D2C, operation data D3A, D3B, and D3C are shown. In the following explanation, when the video data DIA, D1B, and D1C are not distinguished, the video data D1A, D1B, and D1C are described as video data D1. Similarly, when the voice data D2A, D2B, and D2C are not distinguished, the voice data D2A, D2B, and D2C are described as voice data D2 and, when the operation data D3A, D3B, and D3C are not distinguished, the operation data 13A, D3B, and D3C are described as operation data D3.

The server 50 transmits display data D4A, D4B, and D4C and integrated voice data D5A, D5B, and D5C to the first terminal 1A, the second terminal 1B, and the third terminal 1C. In the following explanation, when the display data D4A, D4B, and D4C are not distinguished, the display data D4A, D4B, and D4C are described as display data D4 and, when the integrated voice data D5A, D5B, and D5C are not distinguished, the integrated voice data D5A, D5P, and D5C are described as integrated voice data D5.

The first terminal 1A transmits the video data D1 based on a video captured by the camera 16 and the voice data D2A based on voice collected by the microphone 17 to the server 50. When receiving operation by the keyboard 15a or the mouse 15b, the first terminal 1A transmits the operation data D3A based on the received operation to the server 50.

Like the first terminal 1A, the second terminal 1B transmits the video data D1B, the voice data DOB, and the operation data D3B to the server 50. The third terminal 1C transmits the video data D1C, the voice data D2C, and the operation data. D3C to the server 50.

The server 50 distributes voices of the conference by use of the conference system 100 to the individual terminals 1. The server 50 generates the integrated voice data D5 based on the voice data D2A, D2B, and D2C. The integrated voice data D5 includes voice detected by the first terminal 1A with the microphone 17, voice detected by the second terminal 1B with the microphone 27, and voice detected by the third terminal 1C with the microphone 37. The first terminal 1A, the second terminal 1B, and the third terminal 1C output voices from the speakers 18, 28, and 38 based on the integrated voice data D5. Consequently, all of the users U who use the conference system 100 can listen to voices of the other users U and hold the conference by voices.

In order to prevent howling in the bases S, the server 50 may differentiate the integrated voice data D5 transmitted to the first terminal 1A, the second terminal 1B, and the third terminal 1C. For example, the server 50 may transmit, to the first terminal. 1A, the integrated voice data D5A including voices based on the voice data D2B and D2C and not including voice based on the voice data D2A. In this case, the first terminal 1A outputs, from the speaker 18, voice detected by the second terminal LB and voice detected by the third terminal 1C. The user U1 can listen to voices uttered by the users U2A, U2B, and U3. Since the first terminal 1A does not output, from the speaker 18, voice uttered by the user U1 himself or herself, it is possible to smoothly hold the conference without causing the user U1 to feel discomfort and without the voice of the user U1 echoing.

In this case, the server 50 may transmit, to the second terminal 1B, the integrated voice data D5B including voices based on the voice data D2A and D2C and not including voice based on the voice data D2B. The server 50 may transmit, to the third terminal 1C, the integrated voice data D5C including voices based on the voice data D2A and D2B and not including voice based on the voice data D2C.

The server 50 transmits the display data D4A to the first terminal 1A. The first terminal 1A displays an image on the first display 14 based on the display data D4A. Similarly, the server 50 transmits the display data. D4B to the second terminal 1B and transmits the display data D4C to the third terminal 1C. The second terminal 1B displays an image on the second display 24 based on the display data D4B. The third terminal 1C displays an image on the third display 34 based on the display data D4C.

FIG. 2 is an explanatory diagram showing an example of an execution state of the conference and shows an execution state of the conference in the base S3. In the example shown in FIG. 3, a conference screen 61 is displayed on the third display 34. The conference screen 61 is a screen disposed in a display region 34a of the third display 34.

A display frame 611a and a display frame 611b are disposed on the conference screen 61. The display frames 611a and 611b are regions where images concerning the terminals 1 different from the third terminal 1C are displayed. The display frame 611a is a region corresponding to the first terminal 1A. The display frame 611b is a region corresponding to the second terminal 1B. When the display frames 611a and 611b and a display frame 611c explained below are not distinguished, the display frames 611a, 611b, and 611c are described as display frames 611.

A user image 621a is displayed in the display frame 611a. The user image 621a is an image corresponding to the user U1 who uses the first terminal 1A. The user image 621a is not limited to an image captured by the camera 16. The user image 621a may be an image stored by the first terminal 1A or the server 50 as the image corresponding to the user U1. The user image 621a may be an image generated by the server 50 based on the video data D1A.

User images 621b and 621c are displayed in the display frame 611b. The user image 621b is an image corresponding to the user U2A who uses the second terminal 1B. The user image 621c is an image corresponding to the user U2B. The user images 621b and 621c may be images stored by the second terminal 1B or the server 50. The user images 621b and 621c may be images generated by the server 50 based on the video data D1B. When the user images 621a, 621b, and 621c and a user image 621d explained below are not distinguished, the user images 621a, 621b, 621c, and 621d are described as user images 621.

In this embodiment, a tag 631a is disposed in the display frame 611a. The tag 631a is text indicating content of voice collected by the microphone 17. For example, the server 50 executes voice recognition processing for the voice data D2A and converts the voice data D2A into text data to thereby generate the tag 631a. For example, the conference system 100 updates content of the tag 631a every time the user U1 utters voice. In this case, the tag 631a is a text image indicating content of one utterance of the user U1.

Tags 631b and 631c are disposed in the display frame 611b. The tags 631b and 631c are text indicating content of voice collected by the microphone 27. For example, the server 50 executes voice recognition processing for the voice data D2B and converts the voice data D2B into text data to thereby generate the tags 631b and 631c. The microphone 27 collects voices of the users U2A and U2B. Accordingly, voices uttered by a plurality of people are included in the voice data D2B. When the tags 631a, 631b, and 631c and a tag 631d explained below are not distinguished, the tags 631a, 631b, 631c, and 631d are described as tags 631. The tags 631 correspond to examples of a first text image and a second text image.

In the conference system 100, voice included in the voice data. D2B is distinguished for each of the users U. The tags 631b and 631c shown in FIG. 3 indicate contents of voices collected by the microphone 27. The tag 631b indicates content of an utterance of one of the two users U2A and U2B. The tag 631c indicates content of voice uttered by a user U2 different from the tag 631b. Therefore, since speakers corresponding to the tags 631b and 631c are different, the tag 631b and the tag 631c are displayed in different display forms. That is, the tag 631b is displayed in a first visual expression and the tag 631c is displayed in a second visual expression. In this case, the tag 631a is an example of a first text image indicating content of a first voice and the tag 631b is an example of a third text image indicating content of a third voice.

The visual expression of the tag 631 indicates a characteristic recognizable by the visual sense or the user U. Specifically, the visual expression includes at least any one of an attribute of a font, a form of a frame, and a decoration. Examples of the attribute of the font include the font, a font size, and a color of the font. Examples of the form of the frame include presence or absence of the frame, a color of the frame, the thickness of the frame, and the size of the frame. Examples of the decoration include a background color of the font, a decoration on the outer side of the frame, and a decoration that is temporality splayed. The tag 631b and the tag 631c are displayed in different visual expressions to be visually distinguishable.

The third display 34 displays the conference screen. 61, whereby the user U3 can view images of the users U1, U2A, and U2B, who are the other participants in the conference. The user U3 performs an utterance V1 while viewing the conference screen 61, whereby a mutual conversation among the users U1, U2A, U26, and U3 can be performed. When the user images 621a, 621b, and 621c are videos based on the video data D1A and D1B, the user U3 can view states of the users U1, U2A, and U2B, who are the other participants in the conference, by viewing the display frames 611a and 611b.

Figure 3:
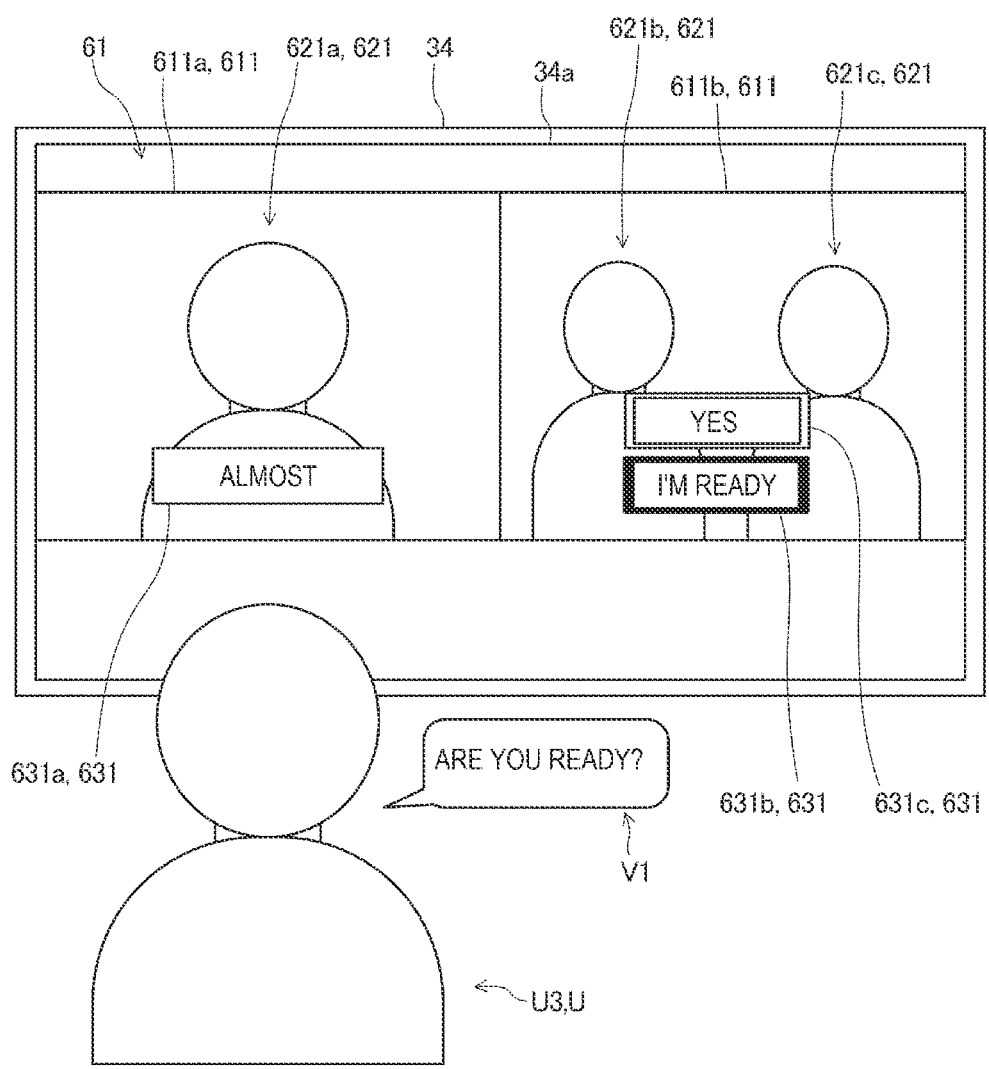
FIG. 3 is an explanatory diagram showing an example of an execution state of a conference.

The conference screen 61 shown in FIG. 3 is an example. For example, the display frame 611 corresponding to the user U3 may be disposed. Specifically, on the conference screen 61, the display frame 611 corresponding to the user U3 is disposed in a position not overlapping the display frames 611a and 611b. The user image 621 corresponding to the user U3 and the tag 631 indicating content of an utterance of the user U3 are displayed in the display frame 611.

The tags 631a, 631b, and 631c may be always displayed or may be displayed only when a predetermined condition is satisfied. Examples of the predetermined condition include a condition that the user U3 performs setting to display the tags 631a, 631b, and 631c and a condition that utterances of the plurality, of users overlap. When timings when the plurality of users U utter overlap, it is hard to listen and understand voices output from she speaker 38. In such a case, contents of the utterances can be visually confirmed by displaying the tags 631a, 631b, and 631c. Therefore, it is possible to urge smooth progress of the conference.

While the conference is executed by the conference system 100, like the third terminal 1C, the first terminal 1A and the second terminal 113 display the conference screen 61. For example, the first terminal 1A displays, with the first display 14, the conference screen 61 on which the display frames 611 corresponding to the second terminal 1B and the third terminal. 1C are disposed. For example, the second terminal 1B displays, with the second display 24, the conference screen 61 on which the display frames 611 corresponding to the first terminal 1A and the third terminal 1C are disposed.

2 Configurations of the Devices Configuring the Conference System

Figure 4:
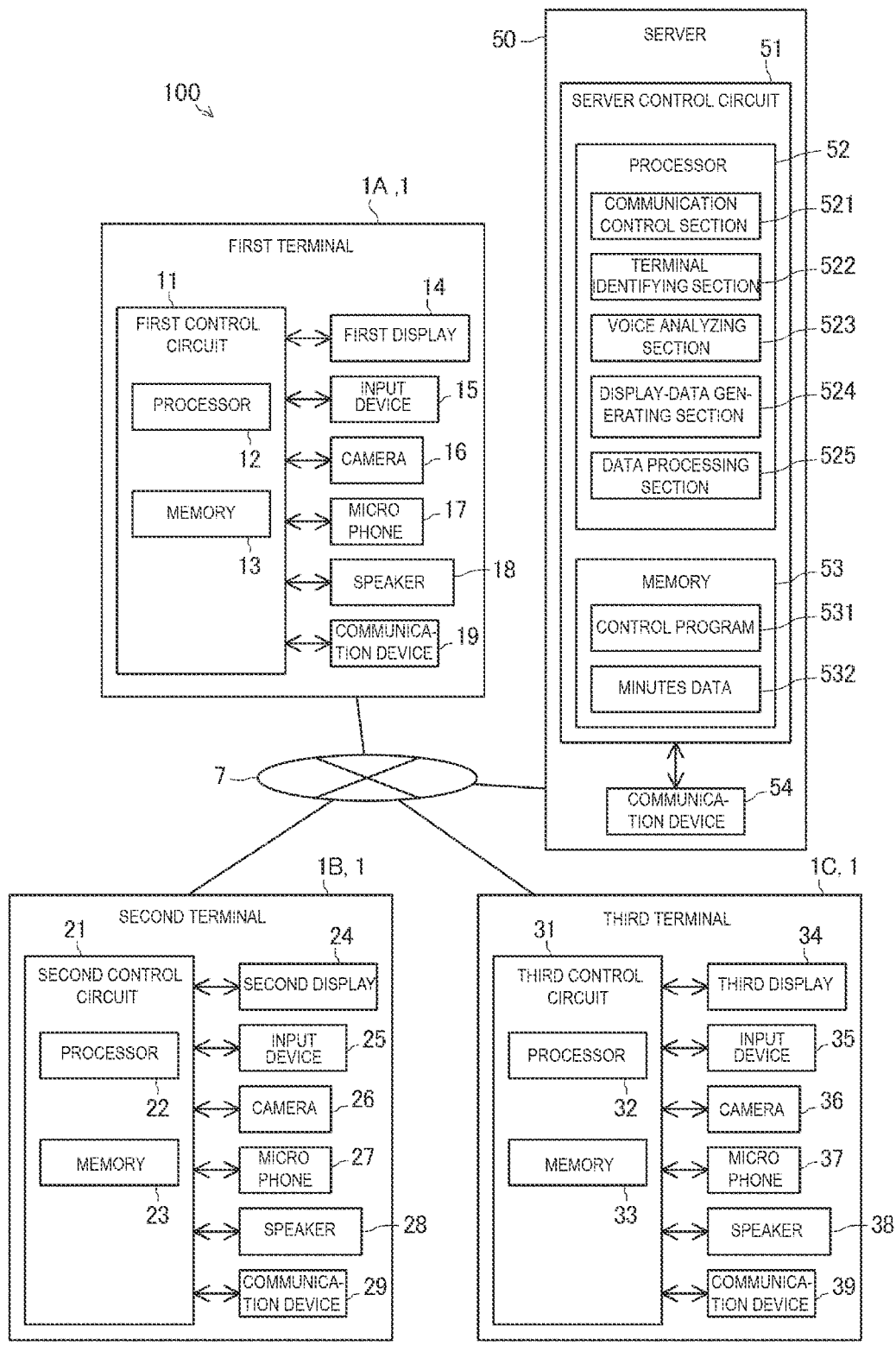
FIG. 4 is a block diagram of devices configuring the conference system.

FIG. 4 is block diagram of the devices configuring the conference system 100.

As shown in FIG. 4, the first terminal 1A includes a first control circuit 11. The first display 14, an input device 15, the camera 16, the microphone 17, the speaker 18, and a communication device 19 are connected to the first control circuit 11.

The input device 15 is a device that the user U uses for input operation and is, for example, the keyboard 15a and the mouse 15b. The input device 15 may be a touch sensor set over the display panel of the first display 14 or may be another device.

The communication device 19 is a device that is connected to the communication network 7 and executes data communication with the server 50 via the communication network 7. The communication device 19 includes, for example, a connector to which a communication cable is coupled and a communication interface circuit. The communication device 19 may include an antenna and a wireless communication circuit and may be connected to the communication network 7 through a wireless communication line.

The first control circuit 11 includes a processor 12 and a memory 13. The processor 12 is configured by a CPU (Central Processing Unit), an MPU (Micro-processing unit), or the like. The processor 12 executes a program to thereby control the sections of the first terminal 1A.

The memory 13 is a storage device that stores a program to be executed by the processor 12 and data in a nonvolatile manner. The memory 13 configured by a magnetic storage device, a semiconductor storage element such as a flash ROM (Read Only Memory), or a nonvolatile storage device of another type. The memory 13 may include a RAM (Random Access Memory) configuring a work area of the processor 12. The memory 13 stores data to be processed by the first control circuit 11 and a control program to be executed by the processor 12.

The processor 12 acquires imaging data of the camera. 16 and generates the video data D1A based on the imaging data. The processor 12 converts voice collected by the microphone 17 into digital voice data. The processor 12 generates the voice data D2A based on the digital voice data. The processor 12 receives an input by the input device 15 and generates the operation data D3A based on the received input.

The processor 12 controls the communication device 19 and transmits the video data DIA, the voice data D2A, and the operation data D3A to the server 50.

The processor 12 receives, with the communication device 19, the display data. D4A and the integrated voice data D5A transmitted by the server 50. The processor 12 controls the first display 14 based on the display data D4A to thereby cause the first display 14 to display the conference screen 61. The processor 12 causes the speaker 18 to output voice based on the integrated voice data D5A.

The second terminal 1B and the third terminal 10 are configured the same as the first terminal 1A. The second terminal 13 includes a second control circuit 21. The second display 24, an input device 25, the camera 26, the microphone 27, the speaker 28, and a communication device 29 are connected to the second control circuit 21.

The input device 25 is a device that the user U uses for input operation and is, for example, the keyboard. 25a. The input device 25 may be a touch sensor set over the display panel of the second display 24 or may be another device.

The communication device 29 is a device configured the same as the communication device 19. The communication device 29 is connected to the communication network 7 and executes data communication with the server 50 via the communication network 7. The communication device includes, for example, a connector to which a communication cable is coupled and a communication interface circuit. The communication device 29 may include an antenna and a wireless communication circuit and may be connected to the communication network 7 through a wireless communication line.

The second control circuit 21 includes a processor 22 and a memory 23. The processor 22 is configured by a CPU, an MPU, or the like. The processor 22 executes a program to thereby control the sections of the second terminal 1B. A specific configuration of the processor 22 is the same as the specific configuration of the processor 12. A specific configuration of the memory 23 is the same as the specific configuration of the memory 13.

The processor 22' acquires imaging data of the camera 26 and Generates the video data D1B based on the imaging data. The processor 22 converts voice collected by the microphone 27 into digital voice data. The processor 22 generates the voice data D2B based on the digital voice data. The processor 22 receives an input by the input device 25 and generates the operation data D3B based on the received input.

The processor 22 controls the communication device 29 and transmits the video data D1B, the voice data D2B, and the operation data D3B to the server 50.

The processor 22 receives, with the communication device 29, the display data D4B and the integrated voice data D5B transmitted by the server 50. The processor 22 controls the second display 24 based on the display data D4B to thereby cause the second display 24 to display the conference screen 61. The processor 22 causes the speaker 28 to output voice based on the integrated voice data D5B.

The third terminal 1C includes a third control circuit 31. The third display 34, an input device 35, the camera 36, the microphone 37, the speaker 38, and a communication device 39 are connected to the third control circuit 31. The third display 34 corresponds to an example of a display. The third control circuit 31 corresponds to an example of a control circuit.

The input device 35 is a device that the user U uses for input operation and is, for example, the keyboard 35*a*. The input device 35 may be a touch sensor set over the display panel of the third display 34 or may be another device.

The communication device 39 is a device configured the same as the communication device 19. The communication device 39 is connected to the communication network 7 and executes data communication with the server 50 via the communication network 7. The communication device 39 includes, for example, a connector to which a communication cable is coupled and a communication interface circuit. The communication device 39 may include an antenna and a wireless communication circuit and may be connected to the communication network 7 through a wireless communication line.

The third control circuit 31 includes a processor 32 and a memory 33. The processor 32 is configured by a CPU, an MPU, or the like. The processor 32 executes a program to thereby control the sections of the third terminal 1C. A specific configuration of the processor 32 is the same as the specific configuration of the processor 12. A specific configuration of the memory 33 is the same as the specific configuration of the memory 13.

The processor 32 acquires imaging data of the camera 36 and generates the video data D1C based on the imaging data. The processor 32 converts voice collected by the microphone 37 into digital voice data. The processor 32 generates the voice data D2C based on the digital voice data. The processor 32 receives an input by the input device 35 and generates the operation data D3C based on the received input.

The processor 32 controls the communication device 39 and transmits the video data D1C, the voice data D2C, and the operation data D3C to the server 50.

The processor 32 receives, with the communication device 39, the display data DIC and the integrated voice data D5C transmitted by the server 50. The processor 32 controls the third display 34 based on the display data D4C to thereby cause the third display 34 to display the conference screen 61. The processor 32 causes the speaker 38 to output voice based on the integrated voice data D5C.

The server 50 includes a server control circuit 51. A communication device 54 is connected to the server control circuit 51. The communication device 54 is connected to the communication network 7 and executes data communication with the terminal 1 via the communication network 7. The communication device 54 includes, for example, a connector to which a communication cable is coupled and a communication interface circuit. The communication device 54 may include an antenna and a wireless communication circuit and may be connected to the communication network 7 through a wireless communication line.

The server control circuit 51 includes a processor 52 and a memory 53. The processor 52 is configured by a CPU, an MPU, or the like. The processor 52 executes a program to thereby control the sections of the third terminal 1C. A specific configuration of the processor 52 is the same as the specific configuration of the processor 12. A specific configuration of the memory 53 is the same as the specific configuration of the memory 13.

The processor 52 executes a control program 531 stored by the memory 53 to thereby function as a communication control section 521, a terminal identifying section. 522, a voice analyzing section 523, a display-data generating section 524, and a data processing section 525.

The communication control section 521 controls the communication device 54 and causes the communication device 54 to execute data communication with the terminal 1. The communication control section 521 causes the communication device 54 to receive the video data D1, the voice data D2, and the operation data D3 transmitted by the terminal 1. The communication control section. 521 transmits, to the terminal 1, the display data D4 and the integrated voice data D5 generated by the processor 52 as explained below.

When receiving the video data D1 from the terminal 1, the terminal identifying section 522 identifies the terminal 1 that transmits the video data D1. Similarly, when receiving the voice data D2, the terminal identifying section 522 identifies the terminal 1 at a transmission source of the voice data D2. When receiving the operation data D3 from the terminal 1, the terminal identifying section 522 identifies the terminal 1 at a transmission source of the operation data D3.

The voice analyzing section 523 analyzes the voice data D2 received by the communication device 54 and converts voice of the user U included in the voice data. D2 into text data indicating utterance content of the user U. The voice analyzing section 523 determines whether the voice included in the voice data. D2 is voice of one user U or voices of a plurality of users. U. When the voice data D2 includes the voices of the plurality of users U, the voice analyzing section 523 classifies the voices included in the voice data D2 for each of the users U and, then, generates text data indicating utterance contents of the respective users U.

The voice analyzing section 523 generates the integrated voice data D5 based on the voice data D2 received from a plurality of terminals 1. The voice analyzing section. 523 may generate the integrated voice data. D5 common to all of the terminals 1. The voice analyzing section 523 may generate the integrated voice data D5A, D5B, and D5C including voices different from one another. For example, the voice analyzing section 523 may generate the integrated voice data D5A not including voice collected by the microphone 17, the integrated voice data D5P not including voice collected by the microphone 27, and the integrated voice data D5C not including voice collected by the microphone 37.

The display-data generating section 524 generates the display data D4. The display-data generating section 524 generates the user images 621 corresponding to the respective users U participating in the conference. For example, the display-data generating section 524 generates, based on a captured image of the camera 16, the user image 621*a* corresponding to the user U1. In this case, the display-data generating section 524 executes, for example, adjustment of resolution of the video data D1A to thereby generate the user image 621*a*. The display-data generating section 524 may set, as the user image 621*a*, a still image stored in association with the user U1 in advance. The display-data generating section 524 generates, in the same manner, the user images 621 respectively corresponding to the users U2A and U2B and the user U3 who use the conference system 100.

The display-data generating section 524 generates, using the user images 621 corresponding to the respective users U participating in the conference by use of the conference system 100, the display data D4 for displaying the conference screen 61. The display-data generating section 524 disposes the display frames 611 corresponding to the respective terminals 1 participating in the conference and disposes the user images 621 in the display frames 611 to thereby generate the display data D4.

The display-data generating section 524 is capable of generating the display data D4 including the text data generated by the voice analyzing section 523. In this case, the display-data generating section 524 disposes the text data Generated by the voice analyzing section 523 over the user image 621 of the user U corresponding to the text data and generates the display data D4. Further, the display-data generating section 524 may generate the display data D4 for displaying the text data in a specific visual expression.

The display-data generating section 524 may generate the display data D4 common to all of the terminals 1 participating in the conference or may generate different display data D4 for each of the terminal. Specifically, the display-data generating section 524 may generate the display data. D4A, D4B, and D4C different from one another. In this case, the display data D4A includes the user images 621 of the users U excluding the user U1 and does not include the user image 621*a* corresponding to the user U1.

The display-data generating section 524 generates, based on the operation data D3, the display data D4 for displaying a conference screen 62 including a first region 64 and a second region 65 explained below. The conference screen 62, the first region 64, and the second region 65 are explained below.

The data processing section 525 generates minutes data 532 based on the operation data D3 or updates the minutes data 532 and causes the memory 53 to store the minutes data 532.

3. Operation of the Conference System

Figure 5:
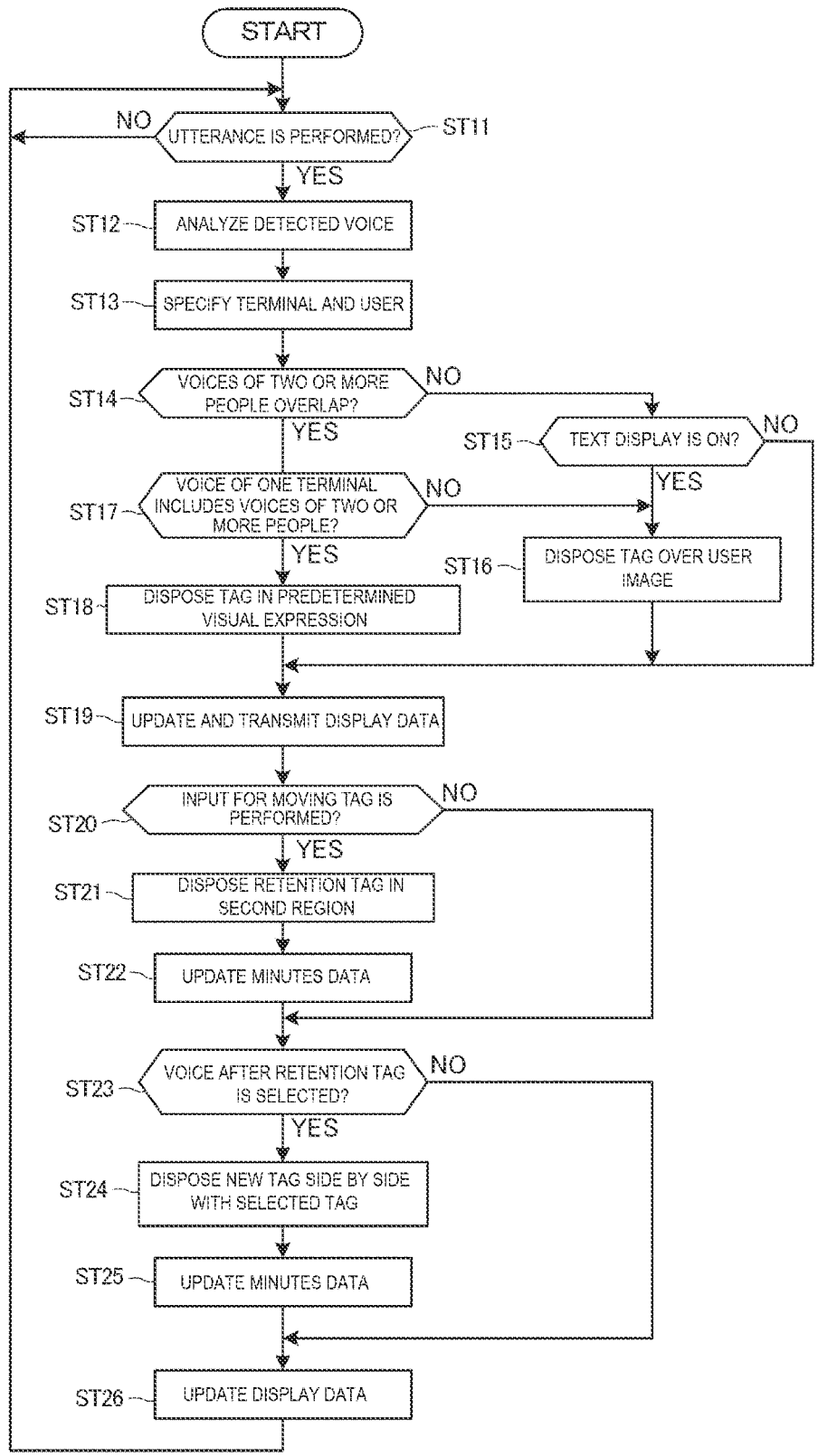
FIG. 5 is a flowchart showing the operation of a server.

FIG. 5 is a flowchart showing the operation of the server 50. In this embodiment, an example is explained in which the server 50 executes a function of receiving the video data. D1, the voice data. D2, and the operation data 13 from the terminal 1 and generating and transmitting the display data D4 and the integrated voice data D5 as shown in FIG. 2. The operation shown in FIG. 5 is executed by the server control circuit 51 included in the server 50.

FIG. 5 shows processing for generating one display data D4. This processing is executed when any one of the display data D4A, D4B, and D4C is generated. Therefore, when the server 50 generates the display data D4A, D4B, and D4C, the processing shown in FIG. 5 is executed for each of the display data D4. When the server 50 transmits common display data D4 co all of the terminals 1, the common display data 14 is generated by the processing shown in FIG. 5.

In step ST11, the server control circuit 51 detects voice from the voice data 12 received from the terminal 1 and determines whether an utterance of the user U is performed. When determining that an utterance is not performed (NO in step ST11), the server control circuit 51 returns to step ST11 and executes the determination in step ST11 after a predetermined time. When determining that an utterance is performed (YES in step ST11), the server control circuit 51 shifts to step ST12.

In step ST12, the server control circuit 51 analyzes the voice detected from the voice data D2. For example, the server control device 51 generates text data indicating content of the voice data D2. In step ST13, the server control circuit 51 specifies the user U who performs the utterance and the terminal 1 used by the user U who performs the utterance. In step ST13, the server control circuit 51 at least detects the voice detected in step ST11, specifies the terminal 1 that transmits the voice data. D2, and associates the voice detected in step ST11 and the terminal 1. For example, the server control circuit 51 identifies, based on identification information of the terminal 1 included in the voice data D2, the terminal 1 that transmits the voice data D2 and associates the identified terminal 1 and the voice included in the voice data D2.

In step ST14, the server control circuit 51 determines whether voices of two or more users U overlap in the detected voice. When determining that voices of two or more users U do not overlap (NO in step ST14), the server control circuit 51 shifts to step ST15. In step ST15, the server control circuit 51 determines whether setting of text display is ON in the terminal 1 that receives the display data D4.

In the third terminal 1C, the user U3 can set ON and Off of the text display by operating the input device 35. When the text display is set to ON, the third terminal 1C displays the conference screen 61 including the tag 631. When the text display is set to OFF, the tag 631 is hidden. That is, the conference screen 61 not including the tag 631 is displayed on the third display 34. When the text display in the third terminal 10 is set to ON or OFF, the third terminal 10 transmits the operation data D3C including data indicating a setting state of the text display to the server 50. The same applies to the first terminal 1A and the second terminal 1B. Therefore, the server control circuit 51 can determine the setting state of the text display based on the operation data D3 transmitted from the terminal 1.

When determining in step ST15 that the setting of the text display is not ON (NO in step ST15), the server control circuit 51 shifts to step ST15 explained below.

When determining in step ST15 that the setting of the text display is ON (YES in step ST15), the server control circuit 51 shifts to step ST16. In step ST16, the server control circuit 51 generates an image of the tag 631 based on text data indicating content of the utterance of the user U. In step ST16, the server control circuit 51 further determines disposition of the tag 631 and the user image 621 such that the tag 631 overlaps the user image 621 corresponding to the terminal 1 specified in step ST13 and shifts to step ST19.

When determining in step ST14 that voices of two or more users U overlap (YES in step ST14), the server control circuit 51 shifts to step ST17. In step ST17, the server control circuit 51 determines whether the voices of the two or more users U are included in the voice data D2 transmitted from the one terminal 1.

When determining that the voices of the two or more users U are included in the voice data D2 transmitted from the one terminal 1 (YES in step ST17), the server control circuit 51 shifts to step ST18. In step ST18, the server control circuit 51 generates the tag 631 based on the text data indicating the content of the voice data D2 transmitted from the one terminal 1. In step ST18, the server control circuit 51 generates a plurality of tags 631 respectively corresponding to utterances of the two or more users U. Further, the server control circuit 51 gives different visual expressions to the plurality of tags 631 generated in step ST18 and determines disposition of the respective tags 631. Specifically, the server control circuit 51 determines display positions of the individual tags 631 such that the plurality of tags 631 do not overlap one another. The server control circuit 51 determines disposition of the tags 631 such that the plurality of tags 631 overlap the user image 621 corresponding to the terminal. 1 identified in step ST13.

After the processing in step ST18, the server control circuit 51 shifts to step ST19.

When determining in step ST17 that the voices of the two or more users U are not included in the voice data D2 transmitted from the one terminal 1 (NO in step ST17), the server control circuit 51 shifts to step ST16.

In step ST19, the server control circuit 51 generates or updates the display data D4 based on the disposition of the user image 621 and the tags 631 determined in step ST16 or step ST18 and transmits the display data D4 to the terminal 1. Consequently, a conference screen is displayed or updated in the terminal 1.

In step ST20, the server control circuit 51 analyzes the operation data D3 transmitted by the terminal 1 to thereby determine whether an input for moving the tags 631 toward the outside of the first region 64 is performed during the display of the conference screen.

Details of the input for the tags 631 are explained with reference to FIGS. 6 to 9.

FIGS. 6, 7, 8, and 9 are diagrams showing an example of the conference screen 62. In FIGS. 6 to 9, an example in which the third terminal 1C displays the conference screen 62 on the third display 34 is shown.

Figure 6:
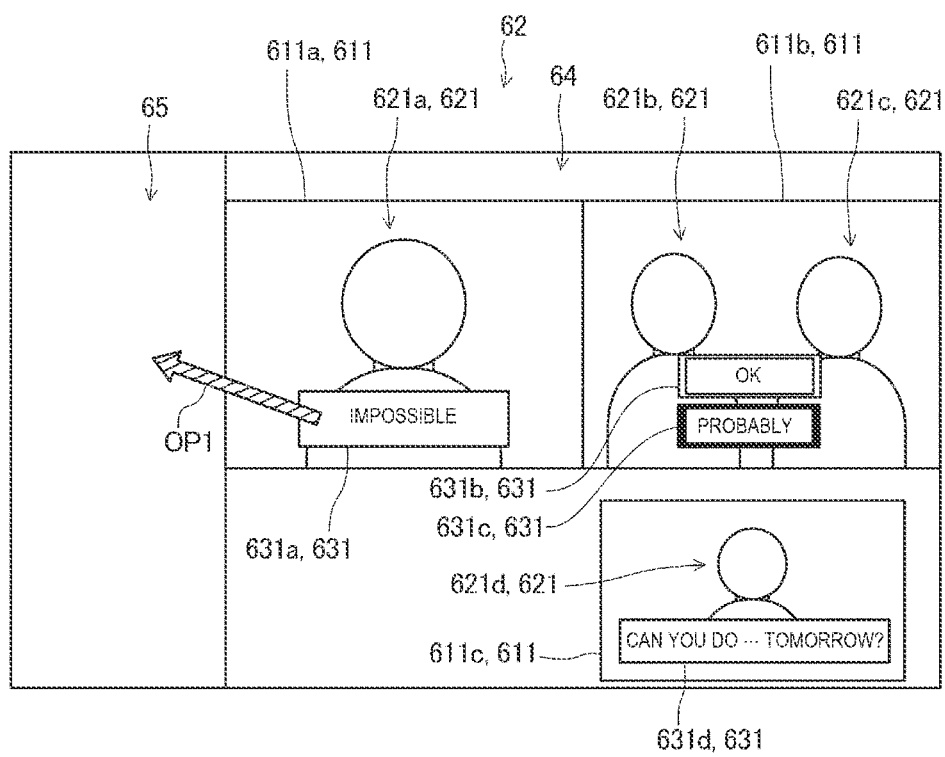
FIG. 6 is a diagram snowing an example of a conference screen.

As shown in FIG. 6, the conference screen 62 includes the first region 64 and the second region 65. In the first region 64, the user image 621a corresponding to the user U1 and the user images 621b and 621c corresponding to the users U2A and U2B are disposed. The user image 621a is disposed in the display frame 611a corresponding to the first terminal 1A. The user images 621b and 621c are disposed in the display frame 611b corresponding to the second terminal 1B. The user image 621a corresponds to an example of a first image. An image corresponding to the second terminal 1B including the user image 621b and the user image 621c corresponds to an example of a second image.

In FIG. 6, the conference screen 62 displayed when the user U2 sets the text display to ON in the third terminal 1C and when timings when the plurality of users U utter overlap is shown. The tags 631a, 631b, and 631c are disposed on the conference screen 62. Since the tag 631a is an image indicating content of voice collected by the first terminal 1A with the microphone 17, the tag 631a is disposed over the user image 621a. Since the tags 631b and 631c are images indicating contents of voices collected by the second terminal 1B with microphone 27, the tags 631b and 631c are disposed over the user images 621b and 621c. The tag 631b and the tag 631c are displayed in different visual expressions. The server control circuit 51 displays the tags 631b and 631c in the display frame 611b without specifying to which of the user image 621b and the user image 621c the tags 631b and 631c respectively correspond. The server control circuit 51 may specify which of the user image 621b and the user image 621c to correspond the tags 631b and 631c respectively.

The display frame 611c corresponding to the third terminal 1C is disposed on the conference screen 62. In the display frame 611c, the user image 621d corresponding to the user U3 who uses the third terminal it and the tag 631d indicating content of voice collected by the third terminal it with the microphone 37 are disposed. Setting about whether to dispose the display frame 611c may be able to be changed by, for example, an input of the input device 35. That is, a configuration in which display corresponding to the third terminal 1C is not included in the conference screen displayed on the third display 34 as shown in FIG. 3 and a configuration in which the display corresponding to the third terminal 1C is included in the conference screen as shown in FIG. 6 may be able to be switched by the input of the input device 35.

In this way, the first region 64 is a region where an image concerning the user U who participates in the conference using the conference system 100 is displayed.

When the utterances of the plurality of users U overlap, the tags 631a to 631d, which are the text images indicating the contents of the utterances, are displayed on the conference screens 61 and 62. Consequently, even if a situation in which it is hard to listen to and understand utterances in the conference occurs, the users U can easily learn the contents of the utterances. Accordingly, since there are few scenes in which contents of utterances are asked again or utterances are repeated, it is possible to allow the conference to smoothly progress.

By setting the text display to ON, the users U can cause the terminal 1 to display the tags 631a to 631d even when utterances do not overlap. Consequently, the users U can visually check contents of the utterances.

Figure 7:
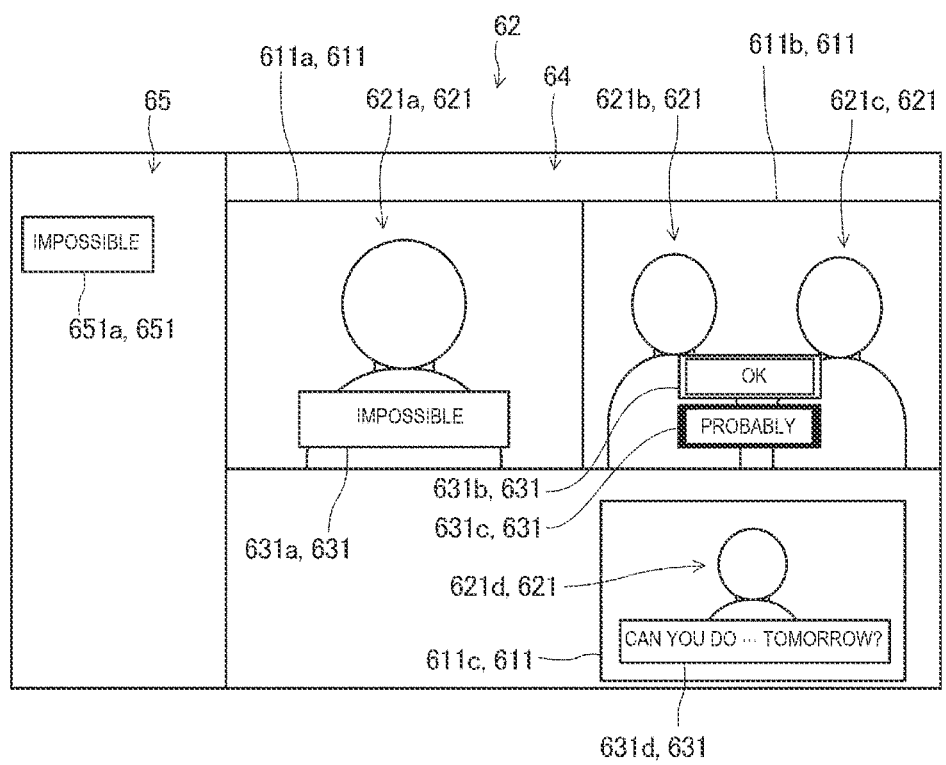
FIG. 7 is a diagram showing an example of a conference screen.

The second region 65 is a region where a selected tag 631 among the tags 631a to 631d displayed in the first region 64 is displayed. As indicated by a sign OP1 in FIG. 6, when an input for moving the tag 631a to the second region 65 is performed, a retention tag 651 having the same content as the content of the tag 631a is displayed in the second region 65. A state in which the retention tag 651 is displayed in the second region 65 is shown in FIG. 7. The input OP1 corresponds to an example of operation for moving the text image to the second region.

One or a plurality of retention tags 651 can be displayed in the second region 65. In an example shown in FIG. 7, a text image indicating the same content as the content of the tag 631a is displayed in the second region 65 as a retention tag 651a. When the retention tag 651a and a retention tag 651b explained below are not distinguished, the retention tag 651a and the retention tag 651b are described as retention tags 651. The retention tags 651 correspond to examples of a first text image and a second text image.

The tags 631 displayed in the first region 64 are updated every time the users U perform utterances. In contrast, the retention tag 651 is continuously displayed in the second region 65 irrespective of the update of the tags 631. Accordingly, an effect of enabling the user U to continuously visually recognize contents of the tag 631 selected by the input OP1 is obtained by displaying the retention tag 651 in the second region 65.

The terminal 1 that receives the input OP1 is not limited. The input OP1 can be performed in all of the terminals 1 participating in the conference. That is, in the state in which the conference screen 62 shown in FIG. 6 is displayed, when the input OP1 is performed by the input device 15 of the first terminal 1A and when the input OP1 is performed by the input device 25 of the second terminal is, the retention tag 651 is displayed in the second region 65.

The second region 65 is displayed in all of the terminals 1 participating in the conference of the conference system 100. Accordingly, all of the users U participating in the conference can visually recognize the display of the second region 65. For example, when the input OP1 is performed by operation of the user U3, all of the first terminal 1A, the second terminal 1B, and the third terminal 1C display the second region 65. This operation is realized by the server control circuit 51 disposing the second region 65 and the retention tag 651 in all of the display data D4A, D4B, and D4C.

The terminal 1 may hide the second region 65 while the input OP1 is not performed. Specifically, the terminal 1 may not display the second region 65 and may display only the first region 64 until the input OP1 is performed in any one of the first terminal 1A, the second terminal 15, and the third terminal 1C. In this case, the conference screen 62 is a screen including the first region 64 and not including the second region 65. This display form can be realized by the server control circuit 51 generating the display data D4 including only the content of the first region 64 and transmitting the display data D4 to the terminal 1.

In this case, when the input OP1 is received in any one of the first terminal 1A, the second terminal 1B, and the third terminal 1C, the display of the second region 65 is started. A form of the input OP1 is not limited to operation for moving the tag 631 from the first region 64 to the second region 65 and only has to be operation for moving the tag 631 toward the outside of the first region 64. When the tag 631 is moved toward the outside of the first region 64 by the input OP1, the server control circuit 51 generates the display data D4, which includes the first region 64 and the second region 65 and in which the retention tag 651 corresponding to the selected tag 631 is disposed, and transmits the display data D4 to the terminal 1.

Figure 8:
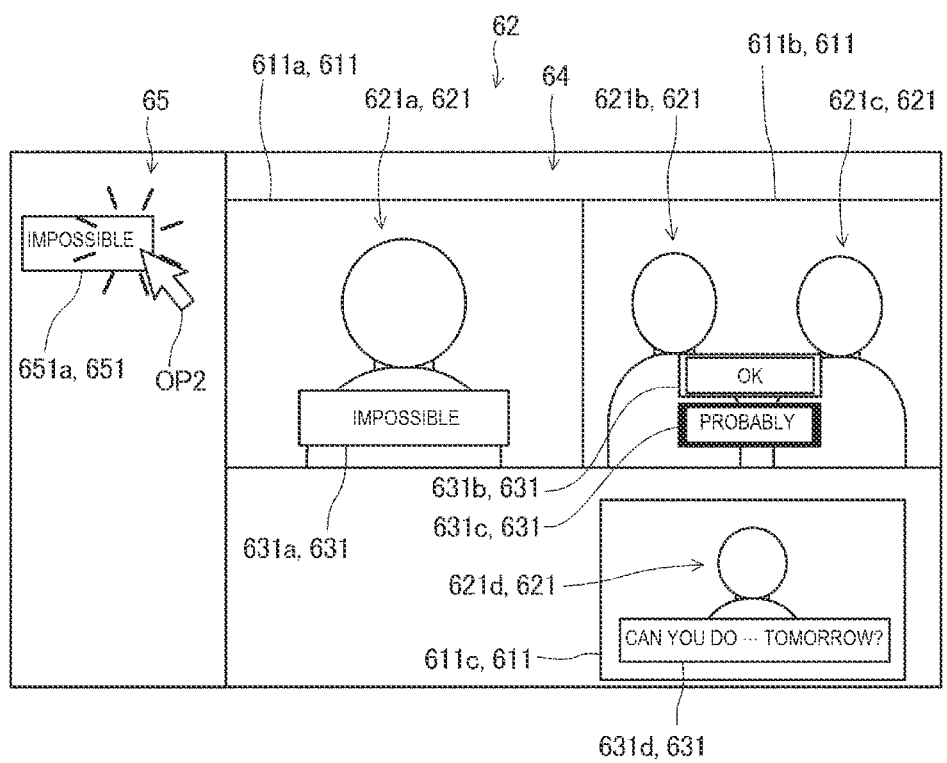
FIG. 8 is a diagram showing an example of conference screen.
Figure 9:
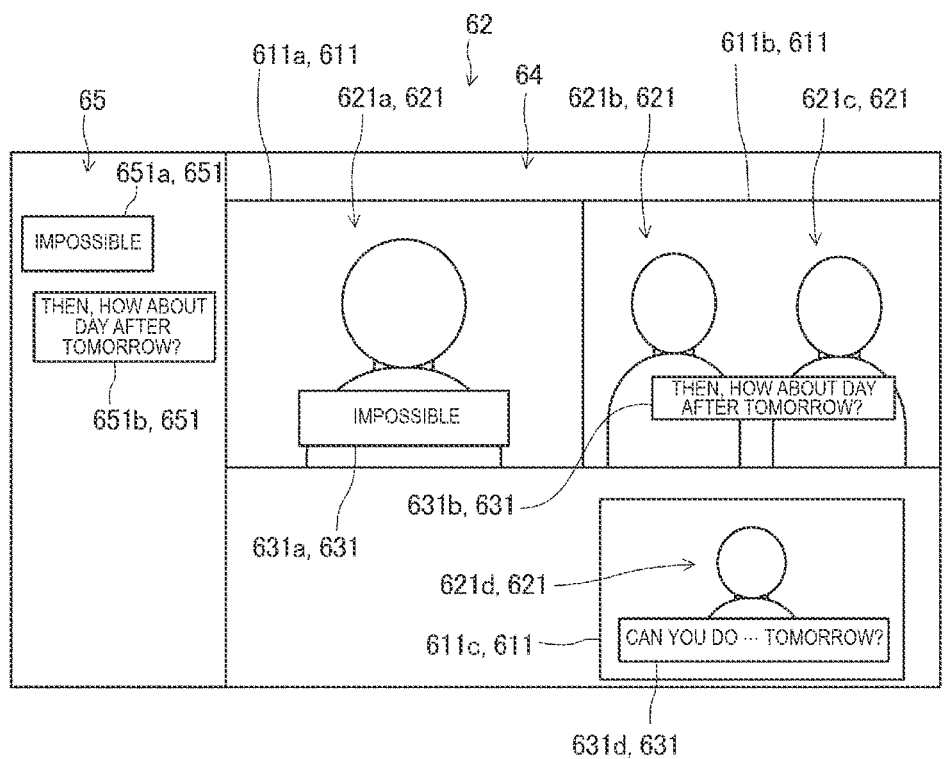
FIG. 9 is a diagram showing an example of a conference screen.

FIGS. 8 and 9 show display examples in the case in which an input to the second region 65 is received.

In the terminal 1, as shown in FIG. 8, an input OP2 to the retention tag 651 displayed in the second region 65 can be received. The input OP2 is an input for displaying another utterance in the second region 65 in association with the retention tag 651. The input OP2 is, for example, operation by a pointing device such as the mouse 15b or a touch panel. Specifically, the input OP2 is, for example, operation for clicking the retention tag 651 or an operation for selecting the retention tag 651 using a menu screen for the retention tag 651. The input OP2 corresponds to an example of selecting operation.

For example, when the second terminal IF receives the input OP2 with the input device 25, as shown in FIG. 9, the retention tag 651b indicating content of voice collected by the microphone 27 after the input OP2 is displayed in the second region 65. In FIG. 9, the tag 631b indicating content of voice collected by the microphone 27 is displayed in the first region 64. Further, the retention tag 651b, which is a text image, indicating the same content as the content of the tag 631b is displayed in the second region 65. In this way, when the terminal 1 receives the input OP2 to the retention tag 651a, the retention tag 651b indicating content of voice collected after the input OP2 is displayed in the second region 65 in association with the retention tag 651a.

In this way, after the retention tag 651a is disposed in the second region 65, the retention tag 651b indicating content of an utterance of the user U is disposed in the second region 65 in association with the retention tag 651a. By performing the input OP2, the user U can cause the terminal 1 to display content of an utterance of the user U after the input OP2 in the second region 65 as the retention tag 651b. Similarly, by performing the input OP2 to the retention tag 651a or the retention tag 651b, the other users U can cause the terminals 1 to display text images indicating contents of utterances of the users U in the second region 65 as a new retention tag 651.

All of the users U participating in the conference can perform the input OP2. For example, the user U1 can perform the input OP2 to the tags 631 corresponding to all of the users U including the user U1. The same applies to the users U2A, U2B, and U3. Consequently, by selecting the retention tag 651, all of the users U participating in the conference can cause the terminals 1 to display utterances of the users U in the second region 65 in correlation with the retention tag 651.

By causing the terminal 1 to display a specific utterance in the second region 65 as the retention tag 651 in the conference, it is possible to continue a conversation concerning a specific topic. For example, only a part of the users U participating in the conference can continue a discussion about the specific topic. Consequently, it is possible to allow a conference for discussing many topics to more smoothly progress.

Further, the user U may cause the terminal 1 to display, in the first region 64, the user image 621 and the tag 631 corresponding to the user U who uses the terminal 1. For example, the third terminal 1C may display, in the display, frame 611c, the user image 621d and the tad 631d of the user U3. In this case, the user U3 can visually check content of an utterance of the user U3. Further, by performing the input OP1 for moving the tag 631d to the second region 65, the user U3 can display the content of the utterance of the user U3 as the retention tag 651.

In step ST20 in FIG. 5, the server control circuit 51 determines whether the input OP1 is executed. When determining that the operation for moving the tag 631 is performed, that is, when determining that the input OP1 is performed (YES in step ST20), the server control circuit 51 shifts to step ST21. In step ST21, the server control circuit. 51 disposes, in the second region 65, the tag 631 to which the input OP1 is performed. Subsequently, in step ST22, the server control circuit 51 adds the content of the tag 631 moved to the second region 65 to the minutes data 532, updates the minutes data 532, and shifts to step ST23. When determining that the operation for moving the tag 631 is not performed (NO in step ST20), the server control circuit 51 shifts to step ST23.

The minutes data 532 is data recording content of the conference. The server control circuit 51 saves text data included in the retention tag 651 as a record of the conference performed by the conference system 100. In steps ST21 to ST22, every time the server control circuit 51 disposes the retention tag 651 in the second region 65, the server control circuit 51 adds text data included in the retention tag 651 disposed anew to the minutes data 532 and causes the memory 53 to store the text data.

In step ST23, the server control circuit 51 determines whether the utterance analyzed in step ST12 is voice uttered after the input OP2 for selecting the retention tag 651. When determining that the utterance is not voice uttered after the input OP2 (NO in step ST23), the server control circuit 51 shifts to step ST26 explained below.

When determining that the utterance is voice uttered after the input OP2 (YES in step ST23), the server control circuit 51 shifts to step ST24. In step ST24, the server control circuit 51 disposes the retention tag 651 having the same content as the content of the tag 631 disposed in step ST16 or step ST18 in the second region 65 side by side with the retention tag 651 selected by the input OP2. In subsequent step ST25, the server control circuit 51 adds the content of the retention tag 651 disposed in step ST24 to the minutes data 532, updates the minutes data 532, and shifts to step ST26.

In step ST26, the server control circuit 51 updates the display data D4 and transmits the updated display data D4 to the terminal 1.

An example is explained above in which, in steps ST23 to ST24 in FIG. 5, about the voice uttered after the input 052 for selecting the retention tag 651, the server control circuit 51 displays the retention tag 651 indicating the content of the utterance in the second region 65. However, this operation may be releasable. For example, in the first terminal 1A, the second terminal 1B, and the third terminal 1C, releasing operation for releasing the selection of the retention tag 651 may be received after the input OP2. The releasing operation is, for example, operation that the user U performs using the input devices 15, 25, and 35. Specifically, examples of the releasing operation include operation of an ESC key of the keyboard 15*a* and the same operation as the input 052.

When the first terminal 1A receives the releasing operation, an utterance of the user U1 detected by the microphone 17 after the releasing operation is not displayed in the second region 65 as the retention tag 651. Content of the utterance of the user U1 may be displayed in the first region 64 as the tag 631. When the setting of the text display is OFF, the content of the utterance of the user U1 is not displayed in the first region 64. The same applies to the second terminal 1B and the third terminal 1C.

When the selection of the retention tag 651 by the input OP2 can be released by receiving the releasing operation, during the progress of the conference, it is possible to switch an operation for causing the terminal 1 to display the content of the utterance as the retention tag 651 and an operation for not causing the terminal. 1 to display the content of the utterance as the retention tag 651. Consequently, is possible to properly use discussion about specific content and a discussion of the entire conference and achieve further improvement of convenience.

4. Action of the Embodiment

As explained above, the display method executed in the conference system. 1.00 includes displaying, side by side, in the first region 64, the user image 621*a* corresponding to the first terminal 1A and the user image 621*b* corresponding to the second terminal 1B. In this display method, specific display is performed when the first voice detected by the first terminal 1A and the second voice detected by the second terminal 1B overlap. The specific display includes displaying the tag 631*a* indicating content of the first voice in the first region 64 in association with the user image 621*a* and displaying the tag 631*b* indicating content of the second voice in the first region 64 in association with the user image 621*b*. The specific display includes, when receiving operation for moving the tag 631*a* to the second region 65 different from the first region. 64, displaying the tag 631*a* in the second region 65 as the retention tag 651*a*.

With this display method, since the tags 631*a* and 631*b* are displayed when the voice collected by the first terminal 1A and the voice collected by the second terminal 1B overlap, even when utterances overlap and it is hard to listen to the utterances, the user U can visually recognize contents of the utterances. Accordingly, it is possible to suppress an event that causes a delay in the conference such as a request for performing an utterance again. Further, according to the operation, the tag 631*a* indicating the content of the utterance is displayed in the second region 65 different from the first region 64 where the user image 621 is displayed. Accordingly, it is possible to attract the attention of the other users U to specific content among contents uttered in the conference. Consequently, it is possible to allow the conference by use of the conference system 100 to smoothly progress. For example, it is possible to, by showing the tag 631 to the user U participating in the conference, cause the user U to accurately recognize the contents of the conference. It is possible to deepen a discussion about the specific content by displaying the retention tag 651*a* in the second region 65.

In the display method explained above, the first terminal 1A causes the first display 14 to display the first region 64 and the second region 65 in a display region of the first display 14. When receiving the input OP1 for moving the tag 631*a* displayed in the first region 64 of the first display 14 to the second region 65, the first terminal 1A may cause the first display 14 to display the tag 631*a* in the second region 65 as the retention tag 651*a*. In this case, the user U1 who uses the first terminal 1A can move the tag 631*a* indicating content of an utterance of the user U1 to the second region 65 and attract the attention of the other users U2A, U2B, and U3 to the content of the utterance of the user U1. Consequently, the user U1 can continue a discussion about the content uttered by the user U1 without repeatedly uttering the content. Therefore, it is possible to allow the conference to more smoothly progress.

In the display method explained above, the displaying the tag 631*a* and the tag 631*b* in the first region. 64 includes displaying the first region 64 in a display region of the third display 34 included in the third terminal 1C. The displaying the tag 631*a* in the second region 65 includes, when the third terminal receives the operation for moving the tag 63*ia* to the second region 65, displaying the tag 631*a* in the second region 65 of the third display 34 as the retention tag 651*a*.

In this case, the user U3 who uses the third terminal 1C can move the tag 631*a* indicating the content of the utterance of the user U1 to the second region 65 and attract the attention of the other users U1, U2A, and U2B to the content of the utterance of the user U1. Consequently even if the user U1 or the user U3 does not repeatedly utter the content uttered by the user U1, it is possible to continue a discussion about the content. Therefore, it is possible to allow the conference to more smoothly progress.

In the display method explained above, when the first voice detected by the first terminal 1A with the microphone 17 and the second voice detected by the second terminal 1B with the microphone 27 do not overlap, the tags 631*a* and 631*b* may not be displayed in the first region 64. In this case, by simplifying the display in the first region 64, it is possible to expect an effect that the user U easily concentrates on listening and understanding of voice and an effect that the user U easily pays attention to the user image 621.

In the display method explained above, the displaying the tag 631*a* in association with the user image 621*a* includes displaying the tag 631*a* over the user image 621*a*. The displaying the tag 631*b* in association with the user image 621*b* includes displaying the tag 631*b* over the user image 621*b*. Since the tags 631 are displayed over the user images 621, correspondence between the tag 631 indicating the content of the utterance and the user image 621 of the user U who performed the utterance is easily seen. Therefore, it is possible to allow the conference to more smoothly progress.

The display method explained above includes, after the tag 631*a* is displayed, when the first terminal 1A detects a new first voice, updating the tag 631*a* displayed in the first region 64 to a new tag 631*a* based on content of the new first voice and not updating the retention tag 651*a* displayed in the second region 65. Consequently, by updating the tag 631 in the first region 64 according to the utterance of the user U, it is possible to cause the display of the first region 64 to follow the progress of the conference. Accordingly, it is possible to allow the conference to more smoothly progress. Further, since the retention tag 651 in the second region 65 is not updated according to an utterance, it is possible to continuously show content of a specific utterance to the user U. Accordingly, it is possible to expect an effect that it is easy to continue a discussion about specific content.

The display method explained above includes receiving the input OP2, which is the selecting operation for selecting the retention tag 651*a* displayed in the second region 65, with the second terminal 13. The display method includes, when the second terminal 1B receives the input OP2, displaying, in the second region 65, the retention tag 651*b* indicating the content of the second voice detected by the second terminal 1B with the microphone 27 after the input OP2. Consequently, the user U can perform an utterance in correlation with the retention tag 651 displayed in the second region 65 and cause the terminal 1 to display content of the utterance in the second region 65. Therefore, since it is easy to perform a discussion about specific content, it is possible to allow the conference to more smoothly progress.

In the display method explained above, after the selecting operation, the releasing operation for releasing the selection of the retention tag 651a displayed in the second region 65 is received by the second terminal 1B. When the releasing operation is received by the second terminal 1B, the tag 631b indicating the content of the second voice detected by the second terminal 1B after the releasing operation is displayed in the first region 64 in association with the user image 621b. Consequently, it is possible to release the selection of the retention tag 651. Accordingly, it is possible to switch, during the progress of the conference, an operation for causing the terminal 1 to display content of an utterance as the retention tag 651 and an operation for not causing the terminal 1 to display the content of the utterance as the retention tag 651. Consequently, it is possible tn properly use a discussion about specific content and a discussion of the entire conference and achieve further improvement of convenience.

In the display method explained above, after the selecting operation, the releasing operation for releasing the selection of the first text image displayed in the second region 65 is received by the second terminal 1B. The display method may be a method of, when the releasing operation is received by the second terminal 1B, not displaying a text image indicating the content of the second voice detected by the second terminal 1B after the releasing operation. In this case, it is possible to release the selection of the retention tag 651. Accordingly, it is possible to switch an operation for causing the terminal 1 to display the content of the utterance as the retention tag 651 and an operation for not causing the terminal 1 to display the content of the utterance as the retention tag 651. Further, it is possible to simplify the display of the conference screen 62 after the selection of the retention tag 651 is released.

In the display method, when the input OP1, which is the operation for moving the tag 631 toward the outside of the first region 64, is received, the display of the second region 65 may be started. In this case, it is possible to use the display region of the first display 14, the second display 24, or the third display 34 for the display of the first region 64 until the input OP1 is performed. Therefore, it is possible to allow the conference to more smoothly progress.

The display method explained above includes the second terminal 1B acquiring the first voice and the third voice with the microphone 27. Further, the display method includes displaying the tag 631b indicating the content of the first voice in the first visual expression and displaying the tag 631c indicating the content of the third voice in the second visual expression different from the first visual expression. Accordingly, the tags 631 corresponding to voices of the plurality of users U are displayed in different visual expressions for each of the users U. Consequently, the other users U can visually learn whether the plurality of tags 631 are contents uttered by different users U or content uttered by one user U.

The third terminal 10 functioning as the display device includes the third display 34 and the third control circuit 31 that controls the third display 34. The third control circuit 31 executes controlling the third display 34 to thereby display, side by side, in the first region 64, the user image 621a corresponding to the first terminal 1A and the user image 621b corresponding to the second terminal 1B, when the first voice detected by the first terminal 1A and the second voice detected by the second terminal 1B overlap, controlling the third display 34 to thereby display the tag 631a, which is the first text image indicating the content of the first voice, in association with the user image 621a and display the tag 631b, which is the second text image indicating the content of the second voice, in association with the user image 621b, and, when receiving the input OP1 for moving the tag 631a to the second region. 65 different from the first region 64, controlling the third display to thereby display the retention tag 651a corresponding to the tag 631a in the second region 65.

Consequently, when voice collected by the first terminal 1A and voice collected by the second terminal 1B overlap, on the third display 34 of the third terminal 1C, the tag 631a is displayed in association with the user image 621a and the tag 631b is displayed in association with the user image 621b. Accordingly, even when utterances overlap and it is hard to listen to the utterances, the user U3 can visually recognize contents of the utterances. Therefore, it is possible to suppress an event that causes a delay in the conference such as a request for performing an utterance again. Further, according to the input OP1, the tag 631a indicating the content of the utterance is displayed in the second region 65 different from the first region 64 where the user image 621 is displayed. Accordingly, by performing the input OP1, the user U3 can attract the attention of the other users U1, U2A, and U2E to specific content uttered in the conference. Consequently, it is possible to allow the conference by use of the conference system 100 to smoothly progress. For example, it is possible to, by showing the tag 631 to the user U participating in the conference, cause the user U to accurately recognize content of the conference. By displaying the retention tag 651a in the second region 65, it is possible co deepen a discussion about the specific content.

The conference system 100 includes the first terminal 11 including the microphone 17, the second terminal 1B including the microphone 27, and the third terminal 1C including the third display 34. The third terminal 1C displays, in the first region 64 of the third display 34, side by side, the user image 621a corresponding to the first terminal 1A and the user image 621b corresponding to the second terminal 1E. The third terminal 1C displays the tag 631a indicating the content of the first voice detected by the first terminal 11 with the microphone 17 in the first region 64 in association with the user image 621a and displays the tag 631b indicating the content of the second voice detected by the second terminal 1B with the microphone 27 in association with the user image 621b. When receiving the input OP1, which is the operation for moving the tag 631a from the first region 64 to the second region 65 of the third display 34, the third terminal 1C displays the retention tag 651a in the second region 65.

Consequently, when voice collected by the first terminal 1A and voice collected by the second terminal 1B overlap, in the first region 64 of the third display 34, the tag 631a is displayed in association with the user image 621a and the tag 631b is displayed in association with the user image 621b. Accordingly, even when utterances overlap and it is hard to listen to the utterances, the user U3 can visually recognize contents of the utterances. Therefore, it is possible to suppress an event that causes a delay in the conference such as a request for performing an utterance again. Further, according to the input OP1, the tag 631a indicating the content of the utterance is displayed in the second region 65 different from the first region 64 where the user image 621 is displayed. Consequently, it is possible to allow the conference by use of the conference system 100 to smoothly progress. For example, is possible to, by showing the tag 631 to the user U participating in the conference, cause the user U to accurately recognize content of the conference. By displaying the retention tag 651a in the second region 65, it is possible to deepen a discussion about the specific content.

In the conference system 100, when the third terminal 1C displays the tag 631a in the first region 64 in association with the user image 621a and the second terminal 1B displays the tag 631b indicating the content of the second voice detected by the microphone 27 in association with the user image 621b, the second terminal 1B may display the user image 621a in the first region 64 of the second display 24 and display the tag 631a indicating the content of the first voice detected by the first terminal 1A in the first region 64 in association with the user image 621a.

In this case, the user image 621a and the tag 631a are displayed in the first region 64 of the third display 34 and the user image 621a and the tag 631a are displayed in the first region 64 of the second display 24 in association with each other. Consequently, the plurality of users U participating in the conference by use of the conference system 100 can visually recognize the user U who performs an utterance and content of the utterance according to the user image 621, and the tag 631a displayed in the first regions 64 of the displays. Accordingly, since the users U can share content uttered in the conference with the other users U, it is possible to allow the conference to smoothly progress.

In the conference system 100, when the input OP1, which is the operation for moving the tag 631a from the first region 64 to the second region 65 of the third display 34, is received by the third terminal 1C, the third terminal 1C may display the retention tag 651a in the second region 65 and the second terminal 1b may display the retention tag 651a corresponding so the tag 631a in the second region 65 of the second display 24.

In this case, according to the input. OP1, the tag 631a indicating the content of the utterance is displayed in the second region 65 of the third display 34 and the tag 631a is displayed in the second region 65 of the second display 24. Accordingly, with the input OP1 as an opportunity, it is possible to share specific content uttered in the conference among the plurality of users U participating in the conference by use of the conference system 100 and attract the attention of the users U to the specific content. Consequently, it is possible to allow the conference by use of the conference system 100 to smoothly progress. For example, it is possible to, by showing the tag 631 to the user U participating in the conference, cause the user U to accurately recognize the contents of the conference. It is possible to deepen a discussion about she specific content by displaying the retention tag 651a in the second region 65.

5. Other Embodiments

The embodiment explained above indicates a specific example to which the present disclosure is applied. The present disclosure is not limited to the embodiment.

For example, in the embodiment, an example is explained in which, as shown in FIG. 2, the server 50 executes the function of receiving the video data D1, the voice data D2, and the operation data D3 from the terminal 1 and generating and transmitting the display data D4 and the integrated voice data D5. The configuration of the present disclosure is not limited to this example. For example, any one of the first terminal 1A, the second terminal 1B, and the third terminal 1C may execute the function of the server 50. That is, any one of the first terminal 1A, the second terminal 1B, and the third terminal 1C may include functional sections equivalent to the communication control section 521, the terminal identifying section 522, the voice analyzing section 523, the display-data generating section 524, and the data processing section 525 included in the server control circuit 51. The first terminal TA may include the same function as the function of the voice analyzing section 523 and may be configured to analyze voice detected by the microphone 17 and generate text data and transmit the voice data D2A including the text data to the server 50. In this case, the server 50 can omit processing for analyzing the voice data D2A and generating text data. The second terminal IF and the third terminal 1C may be configured the same.

The second terminal 1B may include the same function as the function of the voice analyzing section 523 and may be configured to analyze and determine whether voice uttered by the user U2A and voice uttered by the user U2B are included in voice detected by the microphone 27. In this case, the second terminal 1B performs processing for generating text data from the voice detected by the microphone 27 and associating the generated text data with the user U2A and the user U2B, who are speakers. The second terminal 1B transmits, to the server 50, the voice data D2B including the text data of the voice detected by the microphone 27 and data indicating correspondence between the respective text data and the users U2A and U2B. In this case, the server 50 can omit processing for analyzing the voice data D2B and identifying the user U who utters.

Content and a data format of the display data D4 transmitted to the terminal 1 by the server 50 are not limited. For example, the display data D4A may be data of the conference screens 61 and 62 displayed on the first display 14. The display data D4A may be data necessary for the first terminal 1A to display the conference screens 61 and 62. The first terminal 1A may perform processing for generating the data of the conference screens 61 and 62 based on the display data D4A. The same applies to the display data D4B and the display data D4C.

The functional sections shown in FIG. 4 indicate specific functional components and do not limit specific implementation forms. For example, the server 50 does not need to be implemented with hardware individually corresponding to the functional sections of the server control circuit 51. A configuration is also naturally possible in which one processor executes a program to realize functions of a plurality of functional sections. A part of functions realized by software in the embodiment may be realized by hardware or a part of functions realized by hardware in the embodiment may be realized by software. Besides, specific detailed configurations of the other sections of the conference system 100 can also be optionally changed without departing from the gist of the present disclosure.

For example, step units of the operation shown in FIG. 5 are divided according to main processing contents in order to facilitate understanding of the operation of the conference system 100. The present disclosure is not limited by a method of division and names of processing units. The step units may be divided into a larger number of step units according to the processing contents. The step units may be divided such that one step unit includes a larger number of kinds of processing. The order of steps of the step units may be changed as appropriate without hindering the gist of the present disclosure.

What is claimed is:

1. A display method comprising:
    displaying, side by side, in a first region, a first image corresponding to a first terminal and a second image corresponding to a second terminal;
    when a first voice detected by the first terminal and a second voice detected by the second terminal overlap, displaying a first text image indicating content of the first voice in the first region in association with the first image and displaying a second text image indicating content of the second voice in the first region in association with the second image, wherein the first text image has a first visual disposition and the second text image has a second visual disposition; and
    when receiving operation for moving the first text image to a second region different from the first region, displaying the first text image in the second region, and when operation for moving the first text image to an outside of the first region is received, display of the second region is started, and
    wherein, when selecting operation for selecting the first text image displayed in the second region is received by the second terminal, a text image indicating content of a second voice detected by the second terminal after the selecting operation is displayed in the second region.

2. The display method according to claim 1, wherein
    the displaying the first text image and the second text image in the first region includes displaying the first region on a display included in a third terminal, and
    the displaying the first text image in the second region includes, when the third terminal receives operation for moving the first text image to the second region, displaying the first text image in the second region on the display included in the third terminal.

3. The display method according to claim 1, wherein
    the displaying the first text image in association with the first image includes displaying the first text image over the first image, and
    the displaying the second text image in association with the second image includes displaying the second text image over the second image.

4. The display method according to claim 1, further comprising:
    after the first text image is displayed in the first region, when the first terminal detects a new first voice, updating the first text image displayed in the first region to a new first text image based on content of the new first voice; and
    not updating the first text image displayed in the second region.

5. The display method according to claim 1, wherein, after the selecting operation, when releasing operation for releasing the selection of the first text image displayed in the second region is received by the second terminal, a text image indicating content of a second voice detected by the second terminal after the releasing operation is displayed in the first region in association with the second image.

6. The display method according to claim 1, wherein, after the selecting operation, when releasing operation for releasing the selection of the first text image displayed in the second region is received by the second terminal, a text image indicating content of a second voice detected by the second terminal after the releasing operation is not displayed.

7. The display method according to claim 1, further comprising:
    acquiring, by the first terminal, the first voice and a third voice with a microphone; and
    displaying the first text image indicating the content of the first voice in a first visual expression and displaying a third text image indicating content of the third voice in a second visual expression different from the first visual expression.

8. A display device comprising:
    a display; and
    a control circuit configured to control the display, the control circuit programmed to execute
        displaying, side by side, in a first region, by controlling the display, a first image corresponding to a first terminal and a second image corresponding to a second terminal;
        when a first voice detected by the first terminal and a second voice detected by the second terminal overlap, displaying, by controlling the display, a first text image indicating content of the first voice in the first region in association with the first image and a second text image indicating content of the second voice in the first region in association with the second image, wherein the first text image has a first visual disposition and the second text image has a second visual disposition; and
        when receiving operation for moving the first text image to a second region different from the first region, displaying, by controlling the display the first text image in the second region, and
        wherein, when selecting operation for selecting the first text image displayed in the second region is received by the second terminal, a text image indicating content of a second voice detected by the second terminal after the selecting operation is displayed in the second region.

9. A display system comprising:
    a first terminal including a first microphone;
    a second terminal including a second microphone; and
    a third terminal including a display, the third terminal
        displays, side by side, in a first region of the display, a first image corresponding to the first terminal and a second image corresponding to the second terminal;
        displays a first text image indicating content of a first voice detected by the first terminal with the first microphone in the first region in association with the first image;
        displays a second text image indicating content of a second voice detected by the second terminal with the second microphone in association with the second image, wherein the first text image has a first visual disposition and the second text image has a second visual disposition; and
        when receiving operation for moving the first text image from the first region to a second region of the display, displays the first text image in the second region, and when operation for moving the first text image to an outside of the first region is received, display of the second region is started, and
        wherein, when selecting operation for selecting the first text image displayed in the second region is received by the second terminal, a text image indicating content of a second voice detected by the second terminal after the selecting operation is displayed in the second region.

* * * * *